United States Patent [19]
Ochiai

[11] Patent Number: 5,658,216
[45] Date of Patent: Aug. 19, 1997

[54] CVT RATIO CONTROL FOR MOVING OFF AUTOMOTIVE VEHICLE FROM STANDSTILL

[75] Inventor: Tatsuo Ochiai, Fujisawa, Japan

[73] Assignee: Nissan Motor Co., Ltd., Yokohama, Japan

[21] Appl. No.: 439,741

[22] Filed: May 12, 1995

[30] Foreign Application Priority Data

May 12, 1994 [JP] Japan ................................ 6-098923

[51] Int. Cl.⁶ .............................. F16H 9/00; F16H 61/06; F16H 61/18
[52] U.S. Cl. ............................................ 477/46; 477/121
[58] Field of Search ........................... 477/46, 48, 49, 477/115, 121

[56] References Cited

U.S. PATENT DOCUMENTS

| | | | |
|---|---|---|---|
| 4,515,040 | 5/1985 | Takeuchi et al. | 477/48 X |
| 4,536,171 | 8/1985 | Tanaka et al. | 477/48 X |
| 4,545,265 | 10/1985 | Abo et al. | 477/48 |
| 4,566,354 | 1/1986 | Kumura et al. | 477/48 |
| 4,590,561 | 5/1986 | Abo et al. | 477/48 X |
| 4,597,308 | 7/1986 | Tanaka et al. | 477/49 |
| 4,735,113 | 4/1988 | Yamamuro et al. | 74/866 |
| 4,846,019 | 7/1989 | Kumura . | |
| 5,067,372 | 11/1991 | Suzuki | 74/866 |
| 5,069,086 | 12/1991 | Murano et al. . | |
| 5,178,044 | 1/1993 | Suzuki et al. | 477/49 X |
| 5,249,482 | 10/1993 | Okahara et al. | 477/48 |

FOREIGN PATENT DOCUMENTS

| | | |
|---|---|---|
| 3739127 C2 | 9/1987 | Germany . |
| 3939671 A1 | 11/1989 | Germany . |
| 4120288 A1 | 6/1991 | Germany . |

*Primary Examiner*—Charles A. Marmor
*Assistant Examiner*—Saul J. Rodriguez
*Attorney, Agent, or Firm*—Foley & Lardner

[57] ABSTRACT

A control system for a vehicle having an engine-CVT drivetrain suspends the ratio change command during a predetermined period of time from operator's command to request the vehicle to move off from a standstill position.

10 Claims, 12 Drawing Sheets

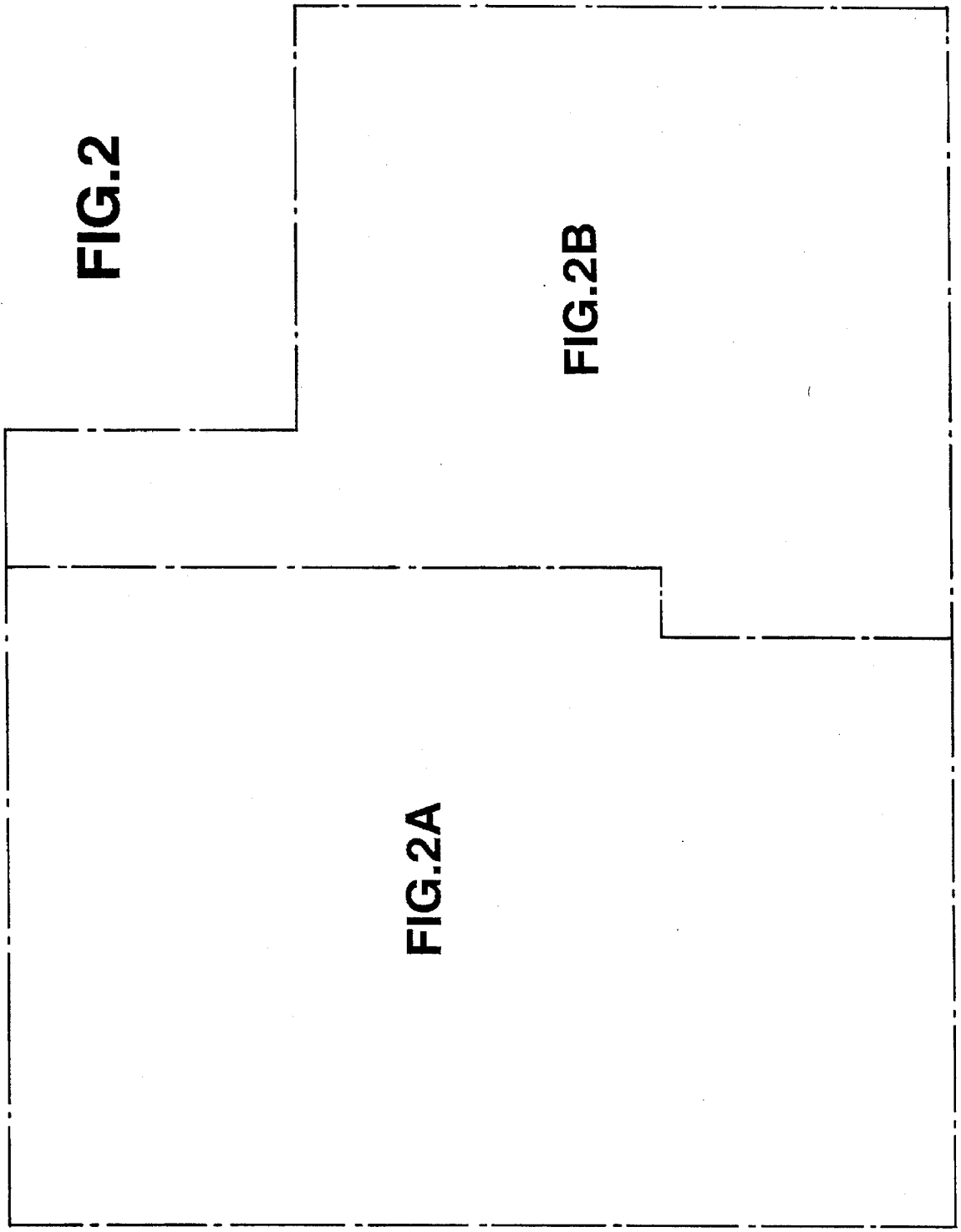

CVT RATIO CONTROL FOR MOVING OFF AUTOMOTIVE VEHICLE FROM STANDSTILL

BACKGROUND OF THE INVENTION

The present invention relates to a control for an automotive vehicle having a drivetrain with an engine and a continuously variable transmission (CVT), and more particularly to a CVT ratio control for providing a good ride feel when the vehicle moves off from a standstill position on a road with low friction coefficient.

According to a CVT ratio control for an automotive vehicle having an engine, revolution speed of an output shaft of the CVT, throttle opening degree of a throttle of the engine, and the engine speed are used as parameters to retrieve a preset shift pattern map to determine an appropriate CVT ratio. According to the preset shift pattern map, the vehicle moves off from a standstill position with the maximunm or largest CVT ratio. The CVT ratio is kept at the largest CVT ratio until the vehicle is accelerated to a predetermined vehicle speed value. At or immediately after the moment when the vehicle speed has reached the predetermined vehicle speed value, the CVT ratio changes in an upshift direction toward a minimum or smallest CVT ratio. This predetermined vehicle speed value is variable with varying throttle opening degree. The more the throttle opening degree increases, the more this predetermined vehicle speed value increases.

This control strategy does not meet with an operator's demand for ratio change if road wheels driven by the output shaft slip when the automotive vehicle is to move off from a standstill position on a road with a low friction coefficient. Under this condition, the revolution speed of the output shaft increases and deviates greatly from the actual vehicle speed at which the vehicle moves, causing the CVT ratio to change in upshift direction in response to an increase in the revolution speed of the output shaft.

If the operator releases a gas pedal linked to the engine throttle to suppress the slip of the road wheels, the revolution speed of the output shaft decreases and the CVT ratio changes in downshift direction. Thus, substantial shocks occur during the CVT ratio change in downshift direction, providing unplesant ride feel.

An object of the present invention is to improve the CVT ratio control of the above kind such that the automotive vehicle moves off from a standstill position on a road with a low friction coefficient without any substantial shift shocks inherent with the undesired downshift operation and without the above-mentioned unplesant ride feel.

SUMMARY OF THE INVENTION

The present invention is operable with a control system for a vehicle having a drivetrain with an engine and a continuously variable transmission (CVT) including a ratio control element positionable to various command positions in response to a ratio change command generated by controller means to establish various CVT ratios, the controller means determining a desired CVT ratio in response to a revolution speed of an output shaft of the CVT and the ratio change command in response to a CVT ratio error of an actual CVT ratio from the desired CVT ratio. According to the present invention, the controller means determines whether there is an operator's command to request the vehicle to move off from a standstill position, and suspends generation of the ratio change command until elapse of a predetermined period of time from the operator's command to request the vehicle to move off from a standstill position.

BRIEF DESCRIPTION OF THE DRAWINGS

FIG. 2 illustrates how

FIGS. 2A and 2B, when combined, are a hydraulic circuit of a hydraulic control system;

DETAILED DESCRIPTION OF THE INVENTION

Figure 1:
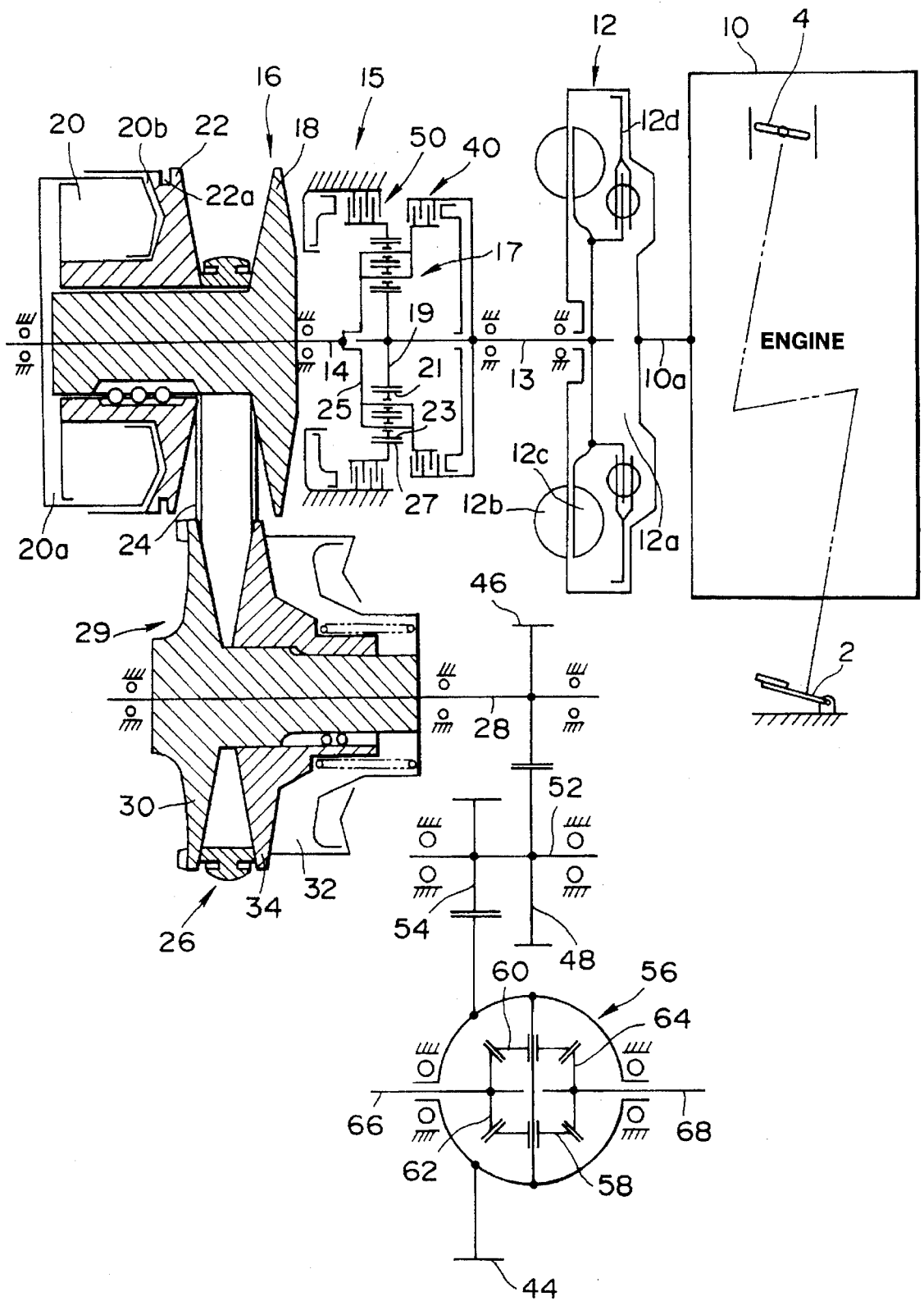
FIG. 1 is schematic view of a continuously variable transmission (CVT) incorporated in a transaxle drivingly connected to an engine.

Referring to FIG. 1, a block 10 represents an engine. The engine 10 has a throttle 4 that opens in degrees in response to depressed position of a gas pedal 2. The engine 10 is drivingly connected to a hydrokinetic torque transmitting unit in the form of a fluid coupling 12 or a torque converter if desired. The fluid coupling 12 is drivingly connected to a continuously variable transmission (CVT) 29 through a forward/reverse change-over mechanism 15 including a planetary gearing 17, a forward clutch 40 and a reverse brake 50. This drive connection can be interrupted when a forward clutch 40 is disengaged with a reverse brake 50 released.

For forward drive, the forward clutch 40 is engaged with the reverse brake 50 released, while for reverse drive, the reverse brake 50 is applied with the forward clutch 40 disengaged. The CVT 29 is drivingly connected to a final drive 56. The CVT 29 includes a driver pulley 16, a follower pulley 26 and a V-belt 24. It will be understood that the present invention is not limited to the use of CVT's with pulley V-belt power transfer. The present invention is operational with any other type of CVT in which the ratio can be controlled, including traction drive type CVT's.

Detailed description of FIG. 1 is found in U.S. Pat. No. 5,067,372 issued on Nov. 26, 1991 to Suzuki and commonly assigned herewith. This U.S. patent corresponds to DE-A 40 25 455. For further understanding of FIG. 1, reference should be made to description of FIG. 1 of this U.S. Pat. No. 5,067,372, which is hereby incorporated by reference.

Figure 2A:
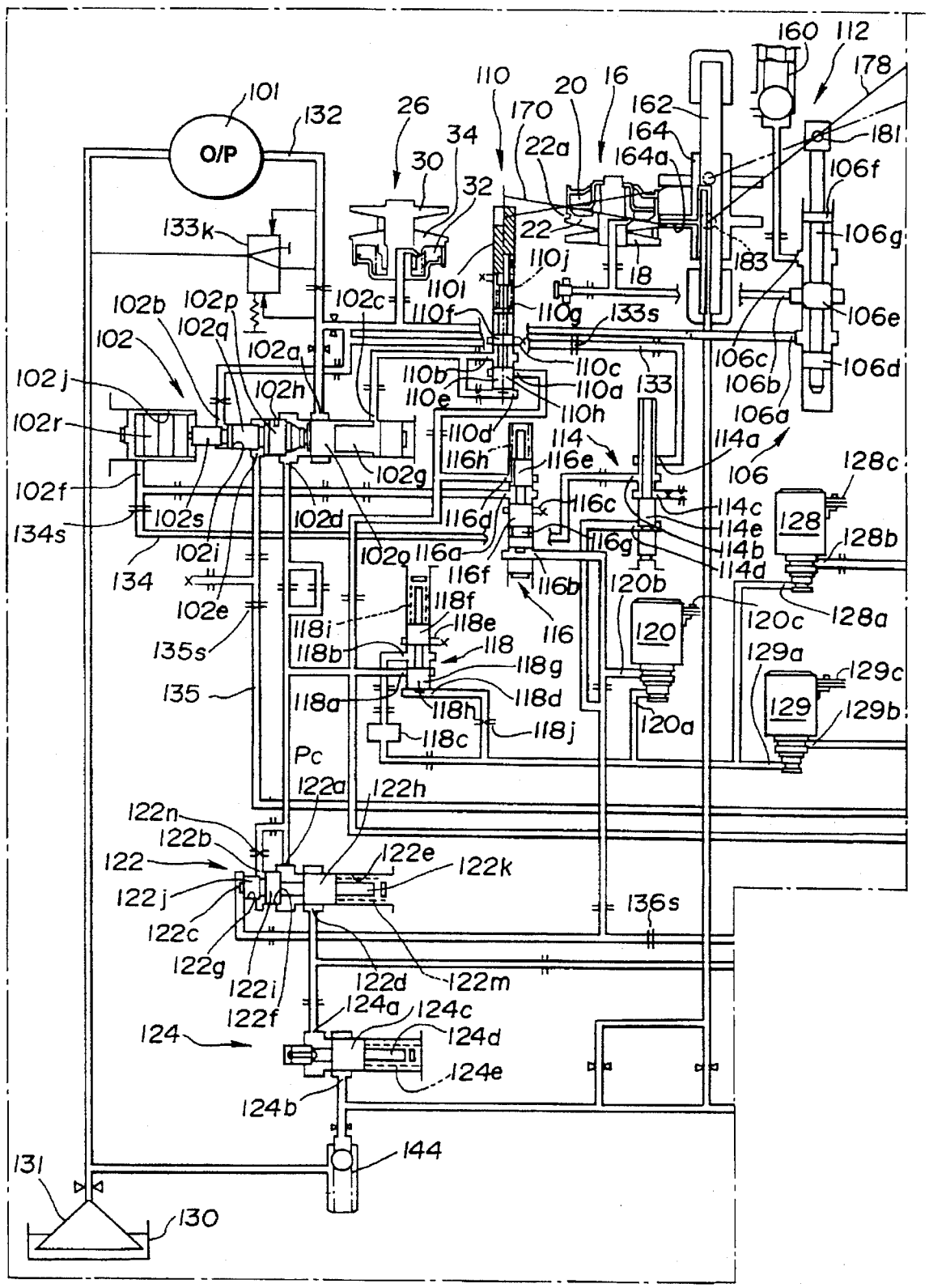
FIG. 2A and FIG. 2B are combined.
Figure 2B:
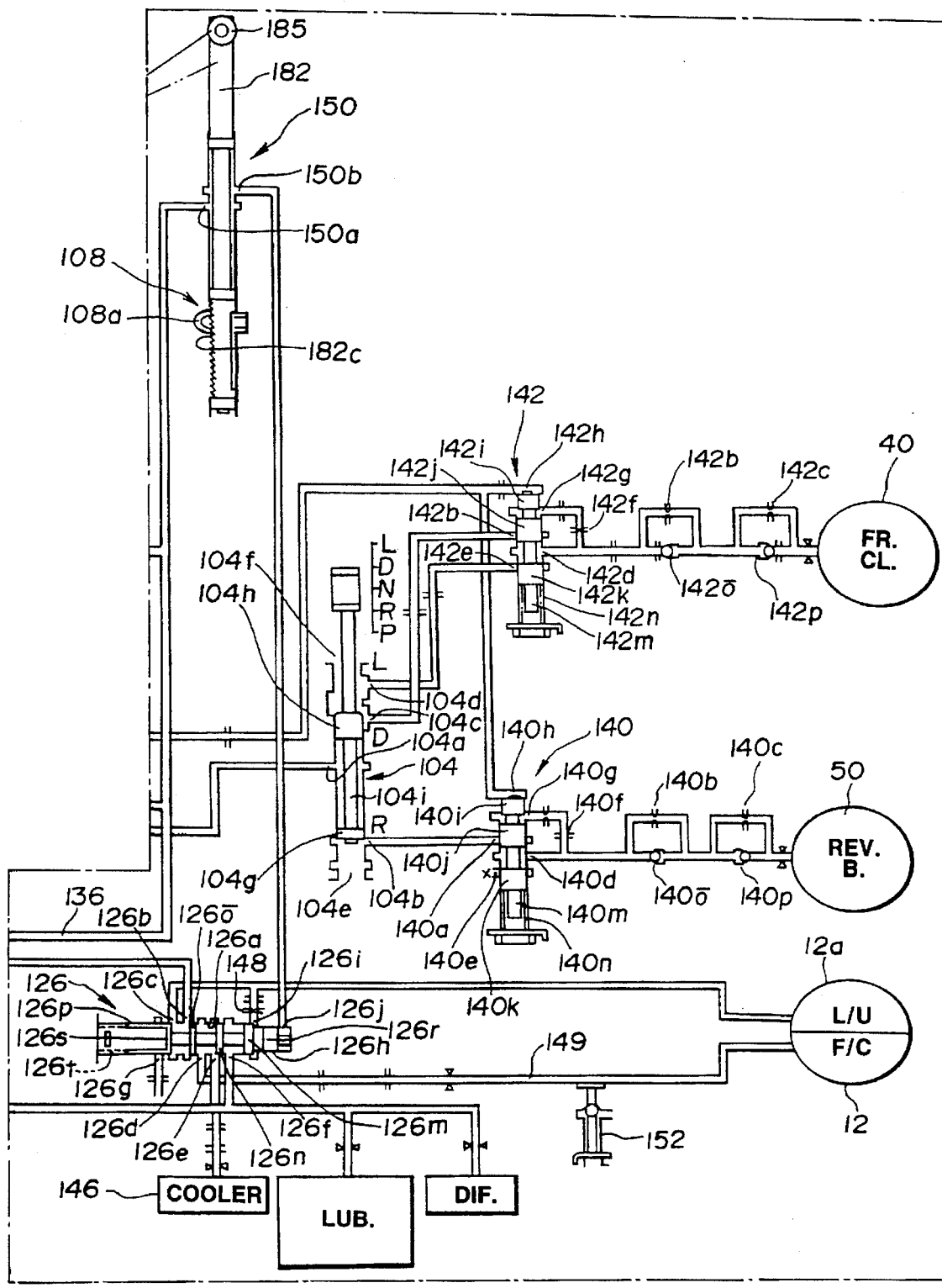

Referring to FIGS. 2A and 2B, a hydraulic control system for the transaxle including the CVT 29 is described.

An oil pump 101 has a suction side to draw in oil from a tank 130 via a strainer 131, and a discharge side connected to one end of a passage 132. The other end of the passage 132 is connected to a port 102a of a line pressure regulator valve 102. This passage 132 has a branch connected to a cylinder chamber 32 of the follower pulley 26 of the CVT 29, a branch connected to a feedback port 102b of the line pressure regulator valve 102, and a branch connected to a port 106a of a shift control valve 106. The passage 132 also has a branch 133 connected to a port 114a of a transfer valve 114. In this embodiment, the branch 133 is blocked by a separator 133s.

In the line pressure regulator valve 102, pressure regulation is effected to generate a line pressure. The line pressure builds up not only at the port 102a, but also at the feedback port 102b. During the pressure regulation, oil under pressure is delivered from a port 102d to ports 122a and 122b of a clutch relief valve 122, an inlet port 118a of a pilot valve 118, a port 104a of a manual selector valve 104, a port 110a of a CVT ratio pressure transducer valve 110, and an inlet port 116d of a pressure modifier valve 116. A line pressure relief valve 133k is schematically shown and connected to the passage 132 to suppress an excessive increase of line pressure.

In addition to the inlet port 118a connected to the port 102d of the line pressure regulator valve 102, the pilot valve 118 has an outlet port 118b, a feedback port 118d and a drain port 118e. Fluidly disposed between the outlet port 118b and feedback port 118d is a filter 118c. Fluidly disposed between the filter 118c and the feedback port 118d is an orifice 118j. The pilot valve 118 has a spool 118h with two lands 118f and 118g and a spring 118i biasing the spool 118h toward the feedback port 118d. The spool 118h is sujected to pressure at the feedback port 118d. If this pressure is zero, the port 118a is uncovered by the land 118g, while the drain port 118e is covered by the land 118f, causing an increase in pressure at the outlet port 118b. This increase in pressure is transmitted to the feedback port 118d, moving the spool 118h against the spring 118i. During this movement of the spool 118h, the land 118g covers the inlet port 118a, while the land 118f uncovers the drain port 118e, causing a drop in pressure at the outlet port 118b. This drop in pressure allows the spring 118i to move the spool 118h toward the feedback port 118d. During this movement of the spool 118h, the land 118f covers the drain port 118e, while the land 118g uncovers the inlet port 118a, causing an increase in pressure at the outlet port 118b again. As a result, the spool 118h assumes an equilibrium position to produce a constant pressure determined by the bias force of the spring 118i.

This constant pressure, which may be called as a pilot pressure, is supplied to an inlet port 120a of a pressure modifier duty solenoid valve 120, an inlet port 128a of a lock-up duty solenoid valve 128, and an inlet port 129a of a clutch duty solenoid valve 129. The pressure modifier duty solenoid valve 120 is responsible for line pressure control. The lock-up duty solenoid valve 128 is responsible for lock-up control. The clutch duty solenoid valve 129 is responsible for creep control.

In addition to the inlet port 120a, the pressure modifier duty solenoid valve 120 has a drain port 120c and an outlet port 120b connected to a port 116b of the pressure modifier valve 116. When duty ($DUTY_{120}$) of the solenoid valve 120 is 0%, a needle closes the drain port 120c, allowing the full supply of the pilot pressure from the inlet port 120a to the outlet port 120b. When the duty $DUTY_{120}$ is 100%, the needle opens the drain port 120c, draining oil from the outlet port 120b. The duty $DUTY_{120}$ can be adjusted to any value falling in a range from 0% to 100%. Pressure appearing at the outlet port 120b, which may be called as a modifier valve control pressure, varies continuously between the highest level as high as the pilot pressure and the lowest level as $DUTY_{120}$ varies continuously between 0% and 100%. In other words, the modifier valve control pressure is inversely proportional to $DUTY_{120}$.

In addition to the port 116b receiving the modifier valve control pressure from the solenoid valve 120, the pressure modifier valve 116 has a drain port 116c and an outlet port 116a connected to a port 102f of the line pressure regulator valve 102. The pressure modifier valve 116 has a spool 116g with two lands 116e and 116f and a spring 116h biasing the spool 116g. The land 116e is formed with an axial through orifice, which provides constant fluid communication between a chamber accommodating therein the spring 116h and an annular chamber defined between the lands 116e and 116f. The outlet port 116a is always open to this annular chamber so that the pressure at the port 116a is transmitted through the axial orifice to the spring accommodating chamber to act on the land 116e in a direction assisting the action of the spring 116h. When the modifier valve control pressure supplied from the solenoid valve 120 to the port 116b is zero, the spool 116g assumes a spring set position where the land 116e covers the port 116d and the land 116f uncovers the drain port 116c. Under this condition, the outlet port 116a is drained. An increase in modifier valve control pressure moves the spool 116g against the spring 116h. During this movement of the spool 116g, the land 116e uncovers the inlet port 116d after the land 116f has covered the drain port 116c. Immediately after the inlet port 116d is uncovered to communicate with the outlet port 116a, there is a pressure increase at the outlet port 116a and also in the spring accommodating chamber. This pressure increase at the outlet port 116a moves the spool 116g in the direction assisting the action of the spring 116h, causing the land 116e to cover the inlet port 116d and the land 116f to uncover the drain port 116c, resulting in a decrease in pressure at the outlet port 116a. As a result, the spool 118h assumes an equilibrium position to produce, at the outlet port 116a, a pressure, which may be called as a modifier pressure, a variable with the modifier valve control pressure that is variable with the duty $DUTY_{120}$ of the solenoid valve 120.

Figure 7:
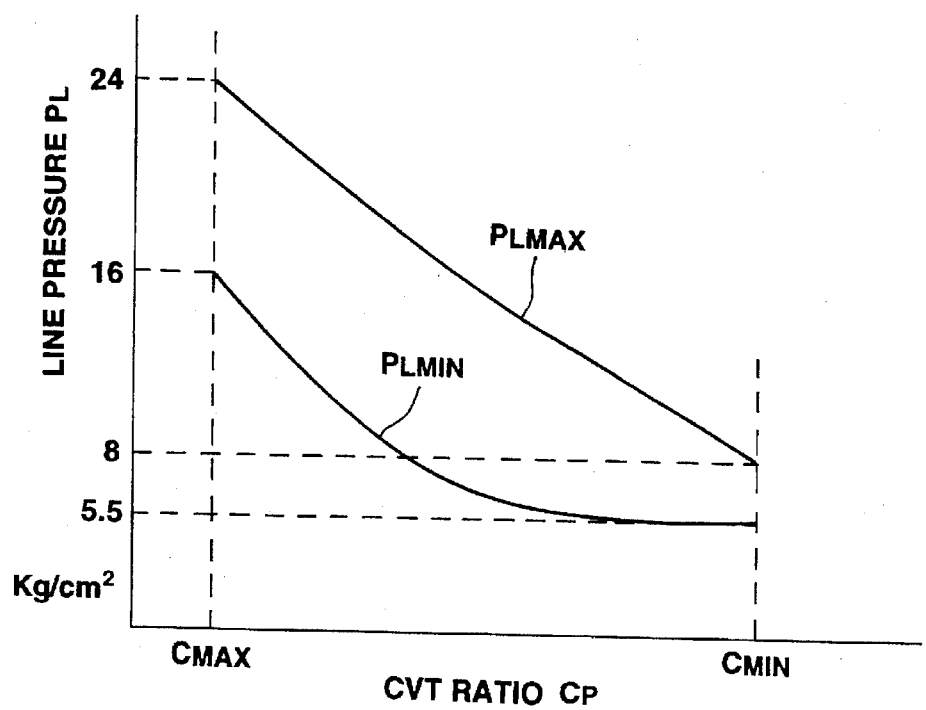
FIG. 7 shows a curve $P_{LMAX}$ interconnecting plots of the maximum value of line pressure $P_L$ at each CVT ratio $C_P$ with the highest value of engine torque $T_E$, and another curve $P_{LMIN}$ interconnecting plots of the minimum value of line pressure $P_L$ at each CVT ratio with the lowest value of engine torque $T_E$.

The modifier pressure is supplied to the port 102f of the line pressure regulator valve 102. In addition to this port 102f and the before mentioned ports 102a, 102b and 102d, the line pressure regulator valve 102 has a port 102e, which is drained, and a port 102c. The line pressure regulator valve 102 has a spool 102s with lands 102o, 102p, 102q and 102r. The land 102r has the largest diameter and is slidably disposed in a bore section 102j having the largest diameter. Among the other three lands, the land 102o has the largest diameter, land 102h has a diameter smaller than that of the land 102o, and land 102s has the smallest diameter. These three lands 102o, 102p and 102q are slidably disposed in the bore sections 102g, 102h and 102i, respectively. The ports 102a and 102c are open to the bore section 102g, the porta 102d and 102e are open to the bore section 102h and port 102f is open to the bore section 102j. The spool 102s is biased by spring means, not illustrated, in a leftward direction, viewing in FIG. 2A. In this embodiment, the port 102e is used as a drain port. If desired, this port 102e may be connected via a branch 135 to the lock-up duty solenoid valve 128. The branch 135 is blocked, in this embodiment, by a separator 135s. The setting of the line pressure regulator valve 102 is such that, with the same pressure supplied to the port 102c, as the modifier pressure at the port 102f decreases, the line pressure $P_L$ increases from a minimum value $P_{LMIN}$ (see FIG. 7) toward a maximum value $P_{LMAX}$. Thus, the line pressure $P_L$ can be adjusted to any value between the minimum and maximum values $P_{LMIN}$ and $P_{LMAX}$ inclusive by varying the duty $DUTY_{120}$ of the solenoid valve 120. In this embodiment, the pressure supplied to the port 102c varies with varying CVT ratio $C_P$. As shown in FIG. 7, as the CVT ratio $C_P$ varies in a downshift direction from the minimum or smallest ratio $C_{MIN}$ toward the maximum or largest ratio $C_{MAX}$, the maximum value $P_{LMAX}$ of line pressure $P_L$ increases at substantially the same rate, while the minimum value $P_{LMIN}$ increases at a progressively increasing rate.

The modifier valve control pressure produced by the pressure modifier duty solenoid valve 120 is also supplied to a port 114d of the transfer valve 114 and a port 122c of the clutch relief valve 122. As mentioned before, the port 114a of the transfer valve 114 is connected to the branch 133, which is blocked by the separator 133s. The transfer valve 114 has a port 114b and a drain port in addition to the ports 114a and 114d. The port 114b is connected through a passage 134 to the port 102f of the line pressure regulator valve 102. But, this passage 134 is blocked by a separator 134s. Thus, the transfer valve 114 does not play any role in this control system owing to the separators 133s and 134s. The transfer valve 114 has a spool 114e, which is moved by the modifier valve control pressure supplied to the port 114d, to cover the drain port 114c, enabling supply of pressure from the port 114a to the port 114b.

Figure 10:
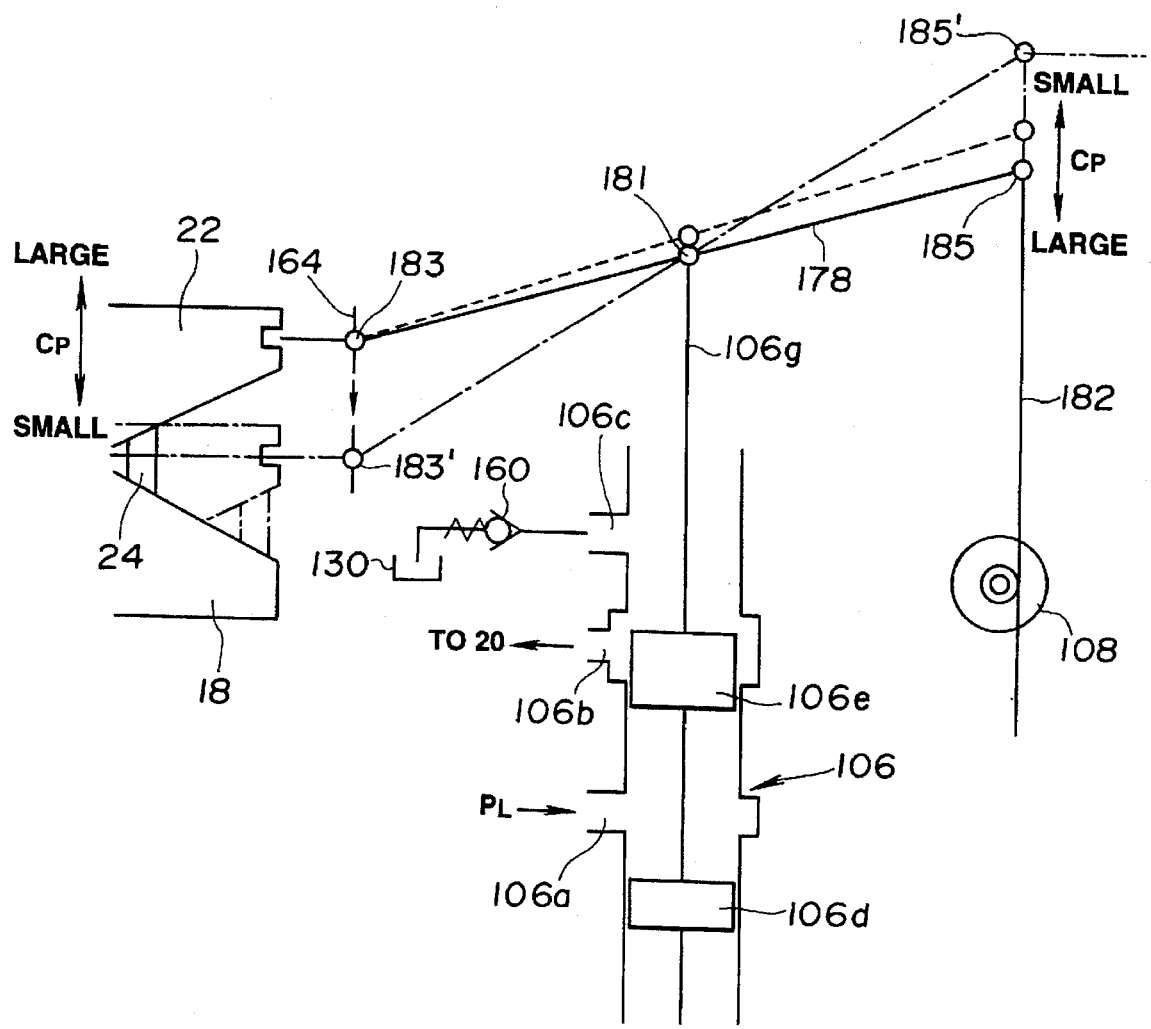
FIG. 10 is a diagram illustrating relation between a stepping motor, a ratio control element, a ratio control valve and a driver pulley.

The pressure supplied to the port 102c of the line pressure regulator valve 102 is generated by the CVT ratio pressure transducer valve 110. This pressure may be called as a CVT ratio dependent pressure since a sensor shoe 164 movable with a positionable pulley half 22 of the driver pulley 16 is connected through a lever 170 to a movable spring retainer 110i to change bias force of a spring 110j in response to a position of the pulley half 22. The sensor shoe 164 is non-rotatably but slidably supported by a guide 162 and has a radially extending flange 164a engaged in groove 22a of the pulley half 22 (see FIGS. 1 and 10) to follow movement of the pulley half 22. The lever 170 is connected to the sensor shoe 164 at one end and to the spring retainer 110i at the opposite end. At a point between the two ends, the lever 170 is pivoted. In addition to the port 110a, the CVT ratio pressure transducer valve 110 has a port 110b connected to the port 102c of the line pressure regulator valve 102, a feedback port 110d connected to the port 110b, and a drain port 110c. The transducer valve 110 has a spool 110h having three lands 110e, 110f and 110g. The spring 110j is disposed between the spring retainer 110i and the spool 110h. As the positional pulley half 22 moves away from the pulley half 18 to increase the CVT ratio, the sensor shoe 160 moves the one end of the lever 170 and the opposite end of the lever 170 moves the spring retainer 110i toward the spool 110h to compress the spring 110j. The bias force of the spring 110j increases, causing the CVT ratio dependent pressure at the port 110b to increase accordingly.

In addition to the inlet port 106a receiving the line pressure, the shift control valve 106 has an outlet port 106b connected to a cylinder chamber 22 of the driver pulley 16, and a low pressure port 106c connected via a pressure maintaining or relief valve 160 to the tank 130. The shift control valve 106 has a spool 106g having three lands 106d, 106e and 106f. As viewed in FIG. 2A, upward movement of the spool 106g from the illustrated position causes the land 106 to increase fluid communication between the outlet port 106b and the inlet port 106a and to decrease fluid communication between the outlet port and the low pressure port 106c, resulting in an increase in pressure within the cylinder chamber 22 of the driver pulley 16, moving the pulley halves 22 and 18 toward each other. Downward movement of the spool 106g from the illustrated position causes the land 106 to decrease fluid communication between the outlet port 106b and the inlet port 106a and to increase fluid communication between the outlet port 106b and the low pressure port 106c, resulting in a decrease in pressure within the cylinder chamber 22 of the driver pulley 16, allowing the V-belt 24 to move the pulley halves 22 and 18 apart.

A ratio control element is in the form of a rod or spool 182 of a shift command valve 150. The rod 182 is drivingly engaged via a rack 182c and a pinion 108a with an actuator in the form of a stepping motor 108.

In response to a ratio change command, the stepping motor 108 turns to move a lever 178, connected to the rod 182 at a pin 185, to control the ratio of the CVT 29. The lever 178 is connected to the rod 182 at one end and to the sensor shoe 164 via a pin 183 at the other end. At a point between the two ends, the lever 178 is pivotably connected via a pin 181 to the spool 106g of the shift control valve 106. This arrangement, which may be called as a shift operation mechanism 112, provides position feedback of the pulley 16 to the shift control valve 106. As the stepping motor 108 moves the lever 178, the shift control valve 106, in response to the movement of the valve spool 106g, alters the pressure supplied to the driver pulley 16 although the pressure supplied to the follower pulley 26 is unaltered. As the pressure supplied to the driver pulley 16 is altered, the pulley halves 18 and 22 move, changing the ratio of the CVT 29. As the sensor shoe 164 moves with the pulley half 22, the lever 178 moves repositioning the valve spool 106g and providing a means for the shift control valve 106 to stop the positional pulley half 22 from moving.

In addition to the inlet port 122a, feedback port 122b and port 122c receiving the modifier valve control pressure, the clutch relief valve 122 has an outlet port 122d. The feedback port 122b is connected via an orifice 122n to the inlet port 122a. The outlet port 122d is connected to an inlet port 124a of a torque converter relief valve 124. The clutch relief valve 122 has three bore sections, namely the largest diameter bore section 122e formed with the inlet and outlet ports 122a and 122d, the smallest diameter bore section 122g formed with the port 122c and an intermediate diameter bore section 122f formed with the feedback port 122b. The intermediate bore section 122f is disposed between and interconnects the largest and smallest diameter bore sections 122e and 122g. The clutch relief valve 122 also has a spool 122k having three lands 122h, 122i and 122j slidably received in the bore sections 122e, 122f and 122g, respectively, and a spring 122m biasing the spool 122k. If desired, the port 122c may be connected via a branch 136 to the lock-up duty solenoid valve 128. In this embodiment, however, the branch 136 is blocked by a separator 136s.

In addition to the inlet port 124a, the torque converter relief valve 124 has an outlet port 124b, a spool 124d with a single land 124c and a spring 124 biasing the spool 124d to move in a direction to cover the outlet port 124b. The outlet port 124b is connected via a lubricant relief ball valve 144 to the suction side of the pump 101. Oil discharged from the outlet port 12b is supplied, as lubricant, to a system such as a power train and V-belt, and differential.

In addition to the inlet port 128a, the lock-up duty solenoid valve 128 has a drain port 128c and an outlet port 128b connected to a port 150a of the shift command valve 150. When duty ($DUTY_{128}$) of the solenoid valve 128 is 100%, a needle closes the drain port 128c, allowing the full supply of the pilot pressure from the inlet port 128a to the outlet port 128b. When the duty $DUTY_{128}$ is 0%, the needle opens the drain port 128c, draining oil from the outlet port 128b. The duty $DUTY_{128}$ can be adjusted to any value falling in a range from 0% to 100%. Pressure appearing at the outlet port 128b, which may be called as a lock-up control pressure, varies continuously between the lowest level and the highest level as high as the pilot pressure as $DUTY_{128}$ varies continuously between 0% and 100%. In other words, the lock-up control pressure is proportional to $DUTY_{128}$.

The lock-up control valve 126 has a bore 126a and a reduced diameter bore 126h. The bore 126a is formed with an inlet port 126b, a first outlet port 126c, a second outlet port 126c, a third outlet port 126d, a fourth outlet port 126e, a fifth outlet port 126f, and a drain port 126g. The reduced diameter bore 126h is formed with a port 126i connected via an orifice 148 to the outlet port 126c and with a port 126j connected to an outlet port 150b of the shift command valve 150, which in turn connected to the inlet port 150a. The inlet port 126b is connected to the outlet port 122d of the clutch release valve 122. The outlet port 126c is connected to a lock-up chamber 12a. The outlet port 126d is connected to the fluid coupling 12. The outlet port 126e is connected to a cooler 146. The outlet port 126f is connected to the lubrication system. The lock-up control valve 126 has a spool 126s having four lands 126m, 126n, 126o and 126p received in the bore section 126a and a land 126r received in the reduced diameter bore section 126h. The lock-up control valve 126 also has a spring 126t biasing the spool 126s. A relief valve 152 is connected to a passage 149 connected to the outlet port 126d at one end and to the fluid coupling 12 at the other end.

When the duty $DUTY_{128}$ is 0%, the lock-up control pressure is zero or almost zero, allowing the spring 126t to move the spool 126s to a spring set position as illustrated in FIG. 2B. In this position, pressurized oil supplied from the outlet port 122d of the clutch relief valve 122 to the inlet port 126b of the lock-up control valve 126 is supplied via the outlet port 126c to the lock-up chamber 12a. This results in disengagement of the lock-up clutch 12d. As the duty $DUTY_{128}$ increases, the spool 126s moves against the spring 126t, increasing fluid communication between the outlet port 126c and the drain port 126g, resulting in gradual decrease in pressure within the lock-up chamber 12a. When the duty $DUTY_{128}$ is 100%, the lock-up control pressure is as high as the pilot pressure, positioning the spool 126s at a lock-up position against the bias of the spring 126t. In the lock-up position, the lock-up chamber 12a is drained, resulting in engagement of the lock-up clutch 12d.

In addition to the inlet port 104a connected to the line pressure regulator valve 112, the manual selector valve 104 has a R range port 104b, a D range port 104c, a L range port 104d and two axially remotest drainages 104e and 104f. Cooperating with these ports is a manually operable spool 104i having two lands 104g and 104h. The spool 104i moves in response to positioning a selector lever (not shown) to any one of six detent positions, namely P (Park), R (Reverse), N (Neutral), D (Drive), and L. The R range port 104b is connected via a reverse brake control valve 140 to the reverse brake 50. The D and L range ports are connected via a forward clutch control valve 142 to the forward clutch 40.

In addition to the inlet port 129a, the clutch duty solenoid 129 has a drain port 129c and an outlet port 129b connected to ports 140h and 142h of the reverse brake control valve 140 and forward clutch control valve 142, respectively. When duty ($DUTY_{129}$) of the solenoid valve 129 is 100%, a needle closes the drain port 129c, allowing the full supply of the pilot pressure from the inlet port 129a to the outlet port 129b. When the duty $DUTY_{129}$ is 0%, the needle opens the drain port 129c, draining oil from the outlet port 129b. The duty $DUTY_{129}$ can be adjusted to any value falling in a range from 0% to 100%. Pressure appearing at the outlet port 129b, which may be called as a clutch control pressure, varies continuously between the lowest level and the highest level as high as the pilot pressure as $DUTY_{129}$ varies continuously between 0% and 100%. In other words, the clutch control pressure is proportional to $DUTY_{129}$.

In addition to the port 140h, the reverse brake control valve 140 has an inlet port 140a connected to the R range port 104b, an outlet port 140d and a feedback port 140g connected via an orifice 140f to the outlet port 140d. The outlet port 140d is connected to the reverse brake 50. The reverse brake control valve 140 has a spool 140m having three lands 140i, 140j and 140k, and a spring 140n biasing the spool 140m. Fluidly disposed between the outlet port 140d and the reverse brake 50 are a discharge flow restricting orifice 140b bypassed by a one-way check valve 140o and a supply flow restricting orifice 140c bypassed by a one-way check valve 140p. Oil to be supplied to the reverse brake 50 passes through the check valve 140o and supply flow restricting orifice 140c. Oil to be discharged from the reverse brake 50 passes through the check valve 140p and discharge flow restricting orifice 140b.

In addition to the port 142h, the forward clutch control valve 142 has a port 142b connected to the D range port 104c, a port 142e connected to the L range port 104d, an outlet port 142d connected to the forward clutch 40, and a feedback port 142g connected via an orifice 142f to the outlet port 142d. The forward clutch control valve 142 has a spool 142m having three lands 142i, 142j and 142k, and a spring 142n biasing the spool 142m. Fluidly disposed between the outlet port 142d and the forward clutch 40 are a discharge flow restricting orifice 142b bypassed by a one-way check valve 142o and a supply flow restricting orifice 142c bypassed by a one-way check valve 142p. Oil to be supplied to the forward clutch 40 passes through the check valve 142o and supply flow restricting orifice 142c. Oil to be discharged from the forward clutch 40 passes through the check valve 142p and discharge flow restricting orifice 142b. It is to be noted that, at the shift position D, the L range port 104d is drained, and the port 142e becomes a drain port and the port 142b becomes an inlet port. At the shift position L, the D range port 104c is drained, and the port 142b becomes a drain port and the port 142e becomes an inlet port.

The reverse brake and forward clutch valves 140 and 142 are identical in construction and function. Let us now consider the case when the shift position D is chosen. The D range port 104c is supplied with line pressure from the inlet port 104a and the L range port 104d is drained. If the clutch control pressure at the port 142h is zero ($DUTY_{129}$=0%), the forward clutch control valve 142 generates at the outlet port 142d a servo activating pressure that is determined by a differenrial area between the lands 142i and 142j and the bias force of the spring 142n. As the clutch control pressure increases, the force acting on the land 142i against the spring 142n increases and thus the servo activating pressure at the port 142d decreases. When the clutch control pressure is as high as the pilot pressure ($DUTY_{129}$=100%), the servo acting pressure is zero or almost zero. From the preceding, it is now understood that the servo activating pressure supplied to the forward clutch 40 or reverse brake 50 can be altered by varying the duty $DUTY_{129}$.

The stepping motor 108 and the three duty solenoid valves 120, 128 and 128 are under the control of a CVT controller 300.

Figure 3:
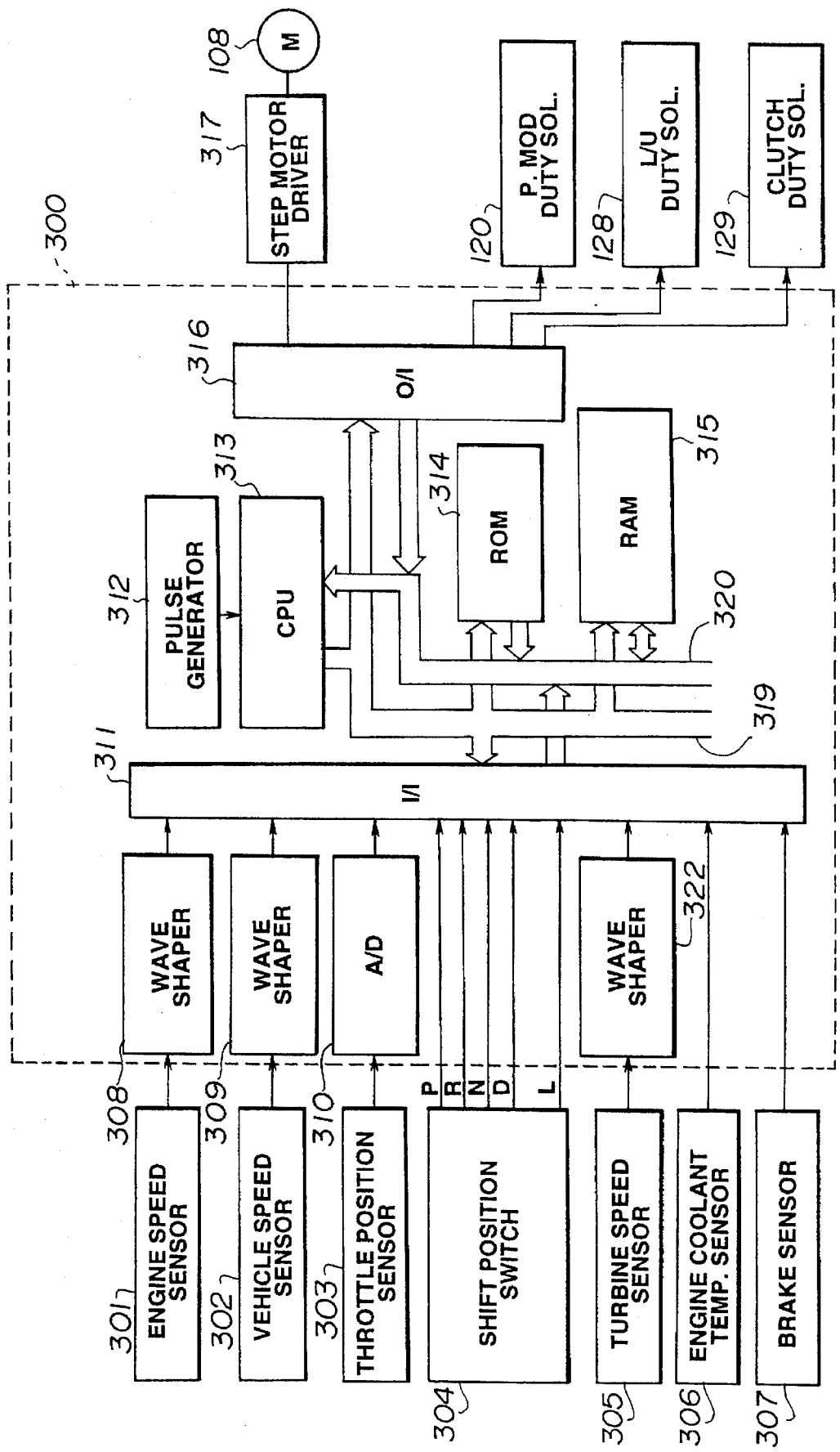
FIG. 3 is a block diagram of a CVT controller.

Referring to FIG. 3, the controller 300 receives output signals of a plurality of sensors and switch that detect operating variables of the motor vehicle. The plurality of sensors and switch comprise an engine speed sensor 301, a vehicle speed sensor 302, a throttle position sensor 303, a shift position switch 304, a turbine speed sensor 305, an engine coolant temperature sensor 306, and a brake sensor 307.

The engine speed sensor 301 detects an engine revolution speed by counting the number of engine ignition spark pulses. The vehicle speed sensor 302 detects revolution speed of the output shaft of the CVT 29 and generates the result as a vehicle speed signal. The throttle opening sensor 303 detects an opening degree of the throttle 4. The shift position switch 304 detects which of different shift positions P, R, N, D, and L the manual selector valve 104 is placed at. The turbine speed sensor 305 detects revolution speed of the turbine shaft 13. The engine coolant temperature sensor 306 generates an output when the engine coolant temperature is lower than a predetermined value. The brake sensor 307 detects whether a foot brake is pressed or not.

Outputs of the throttle position sensor 303 is converted into a digital form at an A/D converter 310, and fed to an input interface 511. Outputs of the engine speed sensor 301, vehicle speed sensor 302, and turbine speed sensor 305 are supplied via the associated wave shapers 308, 309 and 322 to the input interface 311. Outputs of the shift position switch 304, engine coolant temperature sensor 306 and brake sensor 307 are supplied to the input interface 311.

The controller 300 is of a microcomputer based control unit and comprises the input interface 311, a CPU (central processor unit) 313, a reference pulse generator 312, a ROM (random access memory) 315, and an output interface 316. These elements are interconnected by an address bus 314 and a data bus 320. The reference pulse generator 312 generates reference pulse on which the CPU 313 operates. The RAM 317 temporarily stores information from various sensors and switches and parameters necessary for control. Outputs of the controller 300 are supplied via the output interface 316 to a stepping motor driver 317 and also to the pressure modifier duty solenoid valve 120, lock-up duty solenoid valve 128 and clutch duty solenoid valve 129.

Figure 4:
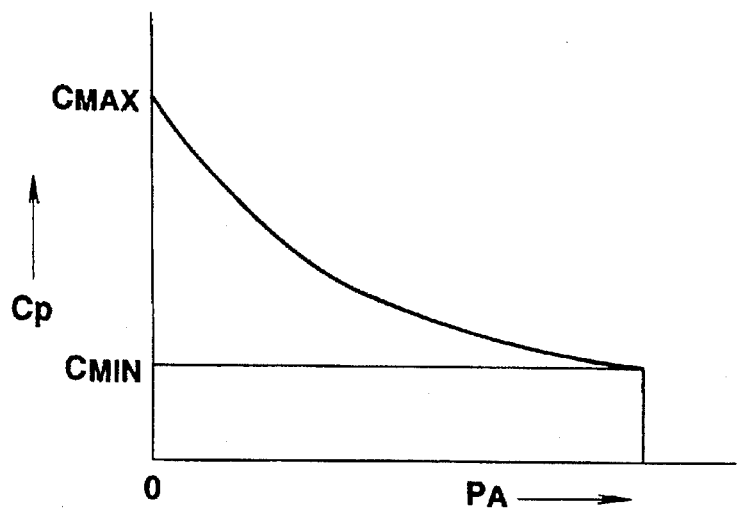
FIG. 4 shows, in the fully drawn line, a $C_P$ (CVT ratio) versus $P_A$ (actual step number) characteristic curve.

FIG. 4 shows variation of the CVT ratio $C_P$ against variation of an actual step number $P_A$, of the stepping motor 108, that is determined by the CVT controller 300. The setting is such that the CVT ratio $C_P$ is the largest or maximum ratio $C_{MAX}$ when the actual step number $P_A$ is zero and decreases toward the smallest or minimum ratio $C_{MIN}$ as the actual step number $P_A$ increases from zero.

Figure 5A:
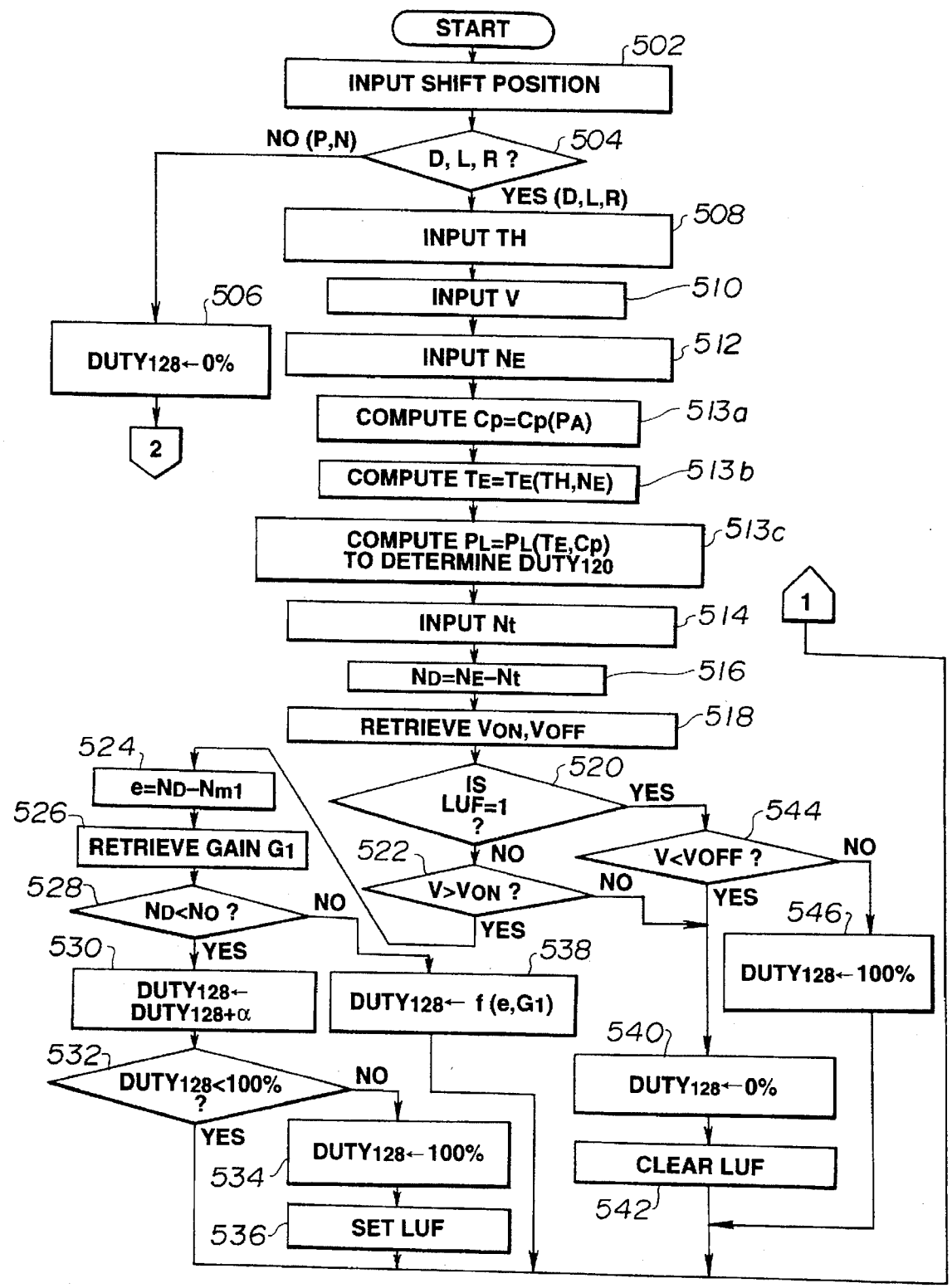
FIGS. 5A and 5B, when combined, are a flow diagram of a main control routine responsible for line pressure control, lock-up control and creep control and CVT ratio control.
Figure 5B:
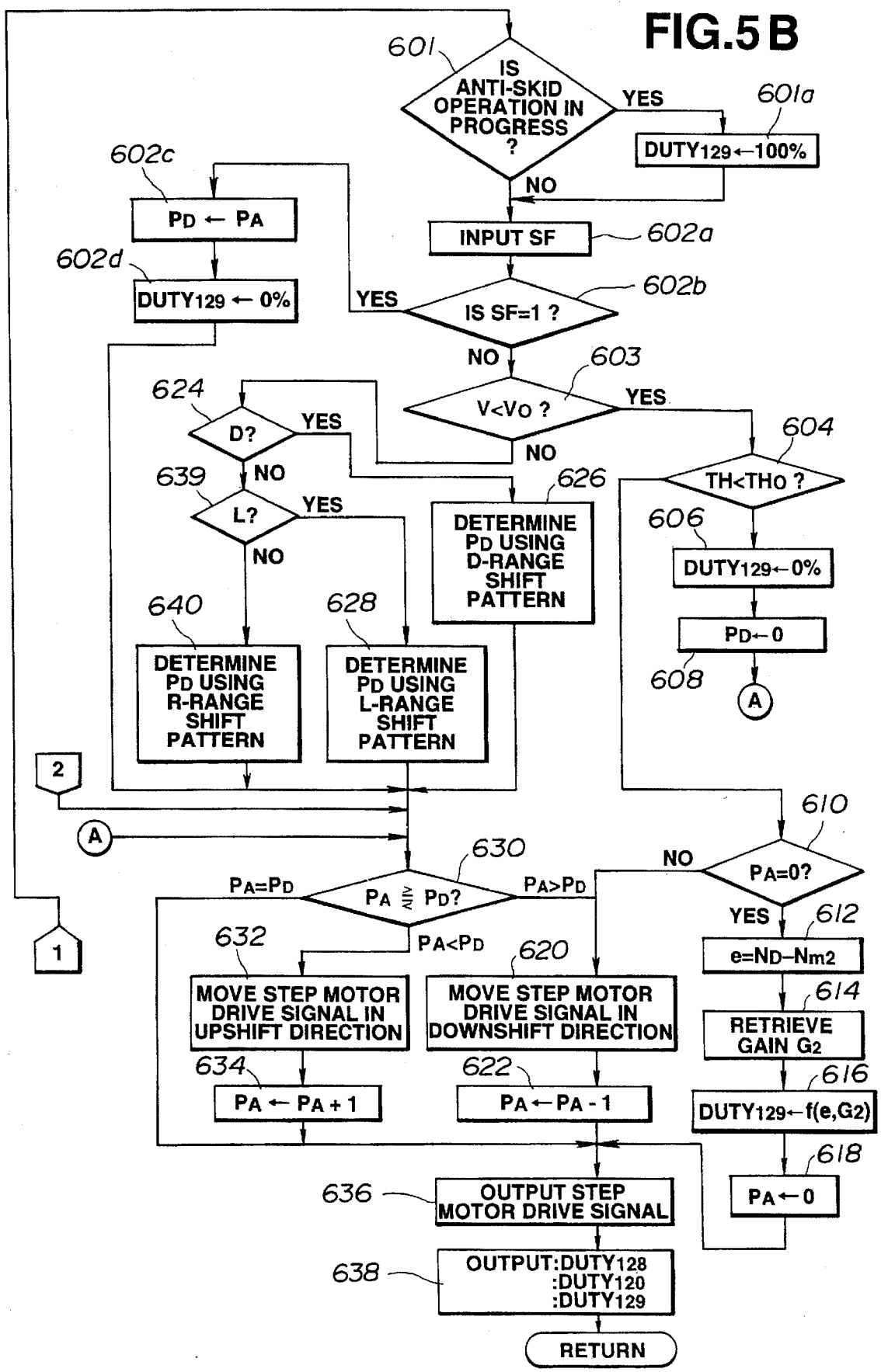
Figure 11:
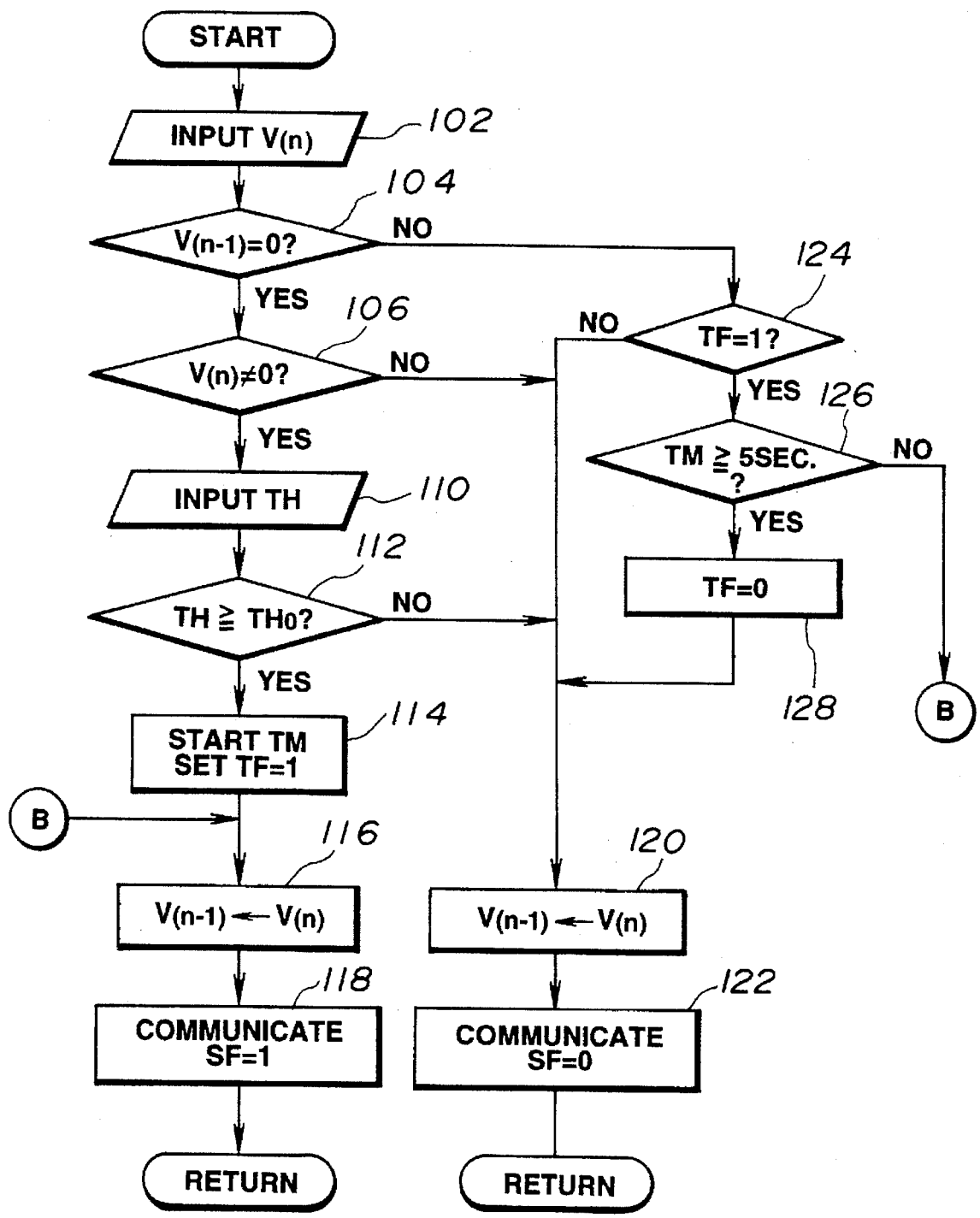
FIG. 11 is a flow diagram illustrating a sub-routine.

A preferred implementation of the present invention may be understood with reference to a main control routine illustrated by the flow diagram of FIGS. 5A and 5B and a sub-routine illustrated by the flow diagram of FIG. 11.

At input box 502, the controller 300 inputs information of transmission shift position, namely, P (Park), R (Reverse), N (Neutral), D (Drive), and L, after performing reading operation of output of the shift position switch 304 through the input interface 311. The controller 300 next determines, at box 504, whether the operator has chosen one of D, L and R or one of P and N.

If the operator has chosen P or N, the duty $DUTY_{128}$ to be output to the lock-up duty solenoid 128 is set equal to 0% at box 506. The controller then compares the actual step number $P_A$ with desired step number $P_D$ at box 630.

If the operator has chosen D or L or R, the controller 300 inputs information of throttle opening degree TH at box 508, and vehicle speed V at box 510. At box 508, reading operation of output of the throttle opening degree or position sensor 303 is performed through the input interface 311.

At the next box 512, the controller 300 inputs information of engine speed $N_E$. In box 512, reading operation of output of the engine speed sensor 301 is performed through the input interface 311.

Figure 6:
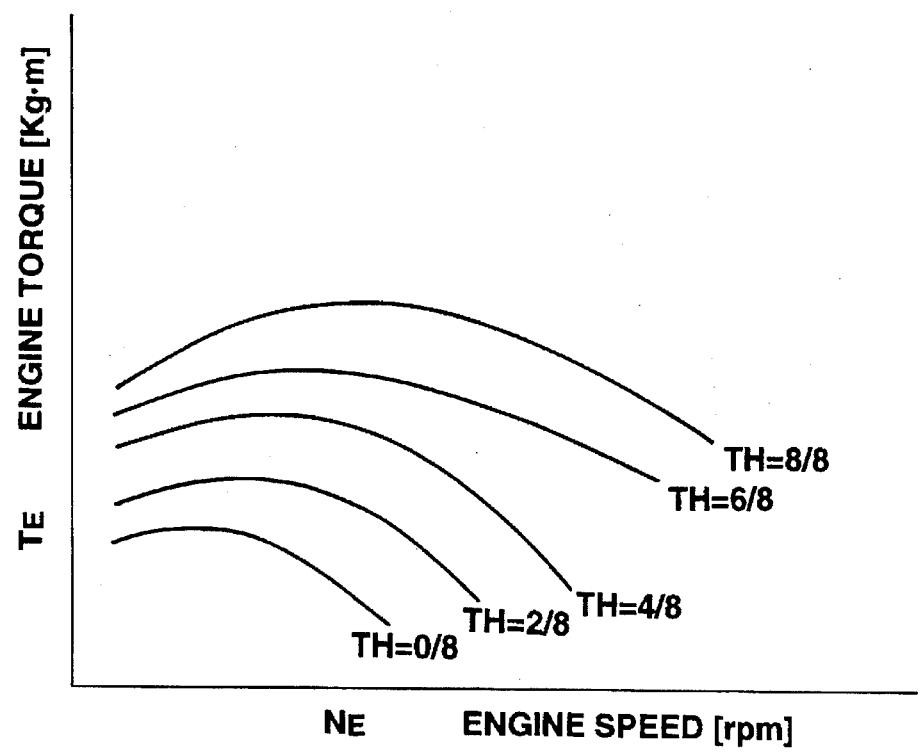
FIG. 6 shows a family of $T_E$ (engine torque) versus $N_E$ (engine speed) characteristic curves in response to TH (throttle opening degree) of the engine.

The controller 300 computes the CVT ratio $C_P$ at box 513a, engine torque $T_E$ at box 513b, and line pressure $P_L$ at box 513c. In box 513a, the controller 300 performs a table look-up operation of FIG. 4 using the actual step number $P_A$ to determine CVT ratio $C_P$. In box 513b, the controller 300 performs a table look-up operation of FIG. 6 using throttle opening degree TH and engine speed $N_E$ to determine engine torque $T_E$. In box 513c, the controller 300 performs a table look-up operation of FIG. 7 using engine torque $T_E$ and CVT ratio $C_P$ and determines duty $DUTY_{120}$ to be output to the pressure modifier duty solenoid valve 120 for generation of line pressure $P_L$ required.

At box 514, the controller 300 inputs information of turbine speed Nt. In box 514, reading operation of output of the turbine speed sensor 305 is performed through the input interface 311.

Figure 8:
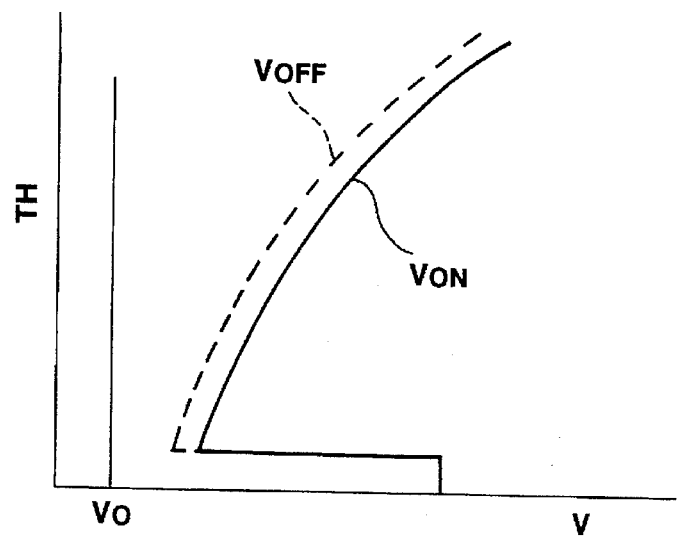
FIG. 8 shows a lock-up on vehicle speed $V_{ON}$ and a lock-up off vehicle speed $V_{OFF}$ along with a threshold vehicle speed $V_0$ of CVT ratio control.

The controller 300 computes a deviation $N_D$ at box 516 by subtracting the turbine speed Nt from the engine speed $N_E$. At box 518, a table look-up operation of FIG. 8 is performed using the throttle opening degree TH and the vehicle speed V to determine a lock-up on vehicle speed $V_{ON}$ and a lock-up off vehicle speed $V_{OFF}$. The controller 300, next, determines, at box 520, whether a lock-up flag LUF is set equal to 1.

If the lock-up flag LUF is set equal to 1, the controller 300 determines, at box 544, whether the vehicle speed V is less than the lock-up off vehicle speed $V_{OFF}$. If, at box 520, the lock-up flag LUF is not set, the controller 300 determines, at box 522, whether the vehicle speed V is greater than the lock-up on vehicle speed $V_{ON}$.

If, at box 544, the vehicle speed V is less than the lock-up off vehicle speed $V_{OFF}$ ($V<V_{OFF}$), the controller 300 sets the duty $DUTY_{128}$ to be output to the lock-up duty solenoid valve 128 equal to 0% at box 540. The controller 300 clears or resets the lock-up flag LUF at box 542. The controller 300, next, goes to box 601. If, at box 544, the vehicle speed V is not less than the lock-up off vehicle speed $V_{OFF}$, the controller 300 sets the duty $DUTY_{128}$ to be output to the lock-up duty solenoid valve 128 equal to 100% at box 546. The controller 300, next, goes to box 601.

If, at box 522, the vehicle speed V is greater than the lock-up on vehicle speed $V_{ON}$, the controller 300 goes to box 524. If, at box 522, the vehicle speed V is not greater than the lock-up on vehicle speed $V_{ON}$, the controller 300 goes to box 540.

In box 524, the controller 300 computes a desired deviation e by subtracting a preset first target value Nm1 from the deviation $N_D$ obtained at box 516. At box 526, the controller 300 performs a table look-up operation of a first feedback gain map to determine a first feedback gain $G_1$ for the desired deviation e. The controller 300, next, determines at box 528 whether the deviation $N_D$ is less than a preset threshold value $N_0$. If, at box 528, the deviation $N_D$ is less than the preset threshold value $N_0$, the controller 300 goes to box 530. If, at box 528, the deviation $N_D$ is not less than the preset threshold value $N_0$, the controller 300 goes to box 538.

In box 530, the controller 300 increases the duty $DUTY_{128}$ to be output to the lock-up duty solenoid valve 128 by a preset small value alpha. The controller 300, next, determines whether the duty $DUTY_{128}$ is less than 100% at box 532. If $DUTY_{128}$ is not less than 100%, the controller 300 sets $DUTY_{128}$ equal to 100% at box 534 and sets the lock-up flag LUF equal to 1 at box 536. Next, the controller 300 goes to box 601. If, at box 532, $DUTY_{128}$ is less than 100%, the controller 300 goes to box 601.

In box 538, the controller 300 computes $DUTY_{128}$, which is expressed by a predetermined function of the deviation e and first feedback gain $G_1$. The controller 300, next, goes to box 601.

In box 601, the controller 300 determines whether anti-skid operation is in progress. The vehicle is installed with a brake system able to perform anti-skid operation to control slip rate of road wheels. The controller 300 communicates with a controller of the brake system to determine whether anti-skid operation is in progress.

If anti-skid operation is not in progress, the controller 300 determines at box 602 whether vehicle speed V is less than a threshold vehicle speed $V_0$ of ratio control. This threshold vehicle speed $V_0$ ranges from 2 km/h to 3 km/h and thus lower than lock-up on and lock-up off vehicle speeds $V_{ON}$ and $V_{OFF}$.

If anti-skid operation is in progress, the controller 300 sets the duty $DUTY_{129}$ to be output to the clutch duty solenoid valve 129 equal to 100% at box 601a. The controller 300, next, goes to box 602a.

In box 602a, the controller 300 inputs information of a ratio change suspending flag SF. The controller 300, next, determines whether the flag SF is set equal to 1 at box 602b. If the flag SF is set equal to 1, the controller 300 sets, at box 602c, desired step number $P_D$ equal to actual step number. $P_A$, and sets, at box 602d, $DUTY_{129}$ equal to 0%. Then, the controller 300 goes to box 630.

If, at box 602b, the flag SF is not set equal to 1, the controller 300 determines whether vehicle speed V is less than threshold vehicle speed $V_0$ at box 603.

If, at box 603, vehicle speed V is less than threshold vehicle speed $V_0$, the controller 300 determines that creep control is required and goes to box 604. If vehicle speed V is not less than threshold vehicle speed $V_0$, the controller 300 determines that ratio control is required and goes to box 624.

Figure 9:
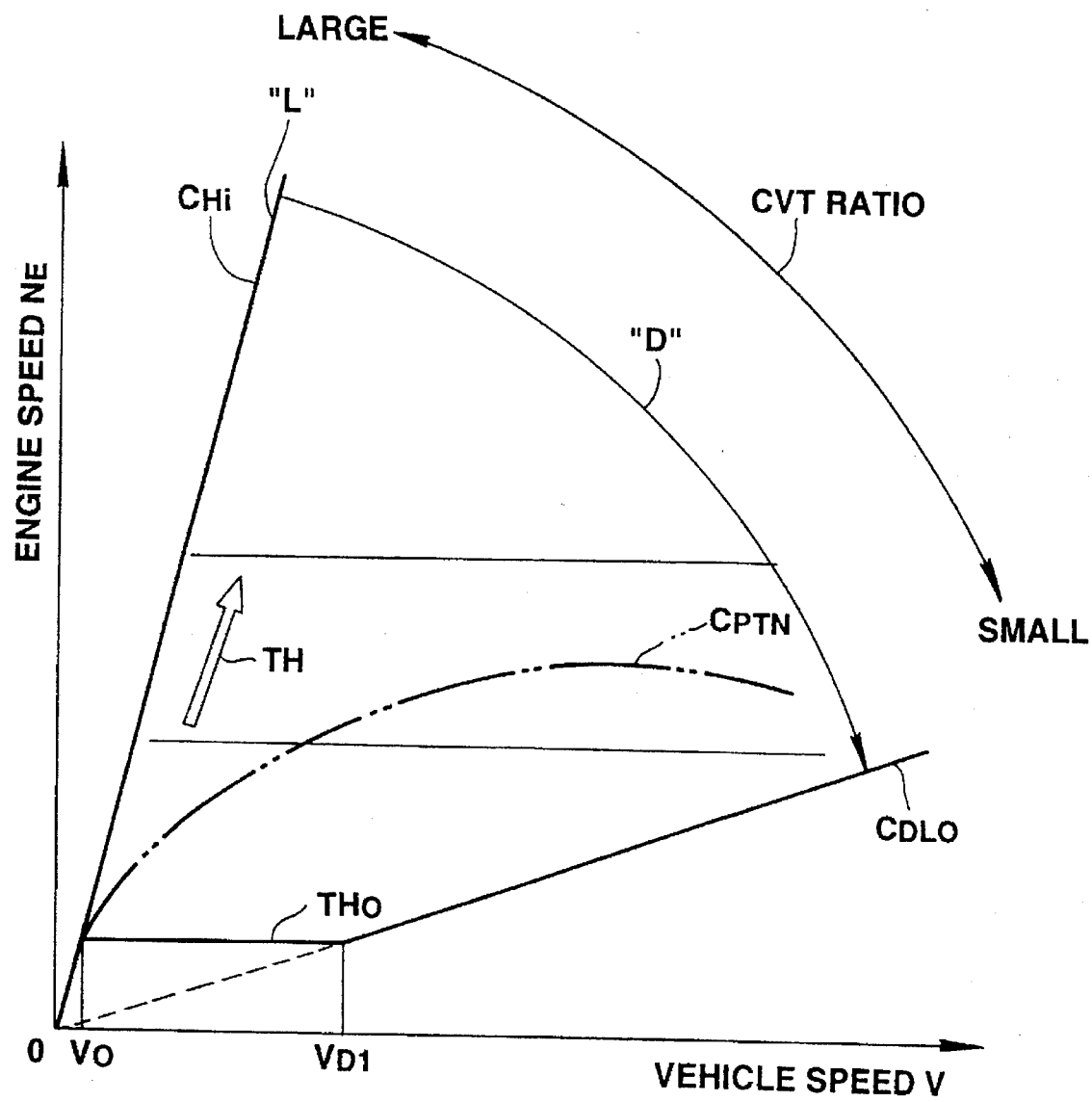
FIG. 9 is a graphical representation of extensions, in CVT ratio, of D range in comparison with a fixed CVT ratio for L range.

In box 604, the controller 300 determines whether throttle opening degree TH is less than a critical throttle opening degree $TH_0$ of idle operation (see FIG. 9). If throttle opening degree TH is less than critical throttle opening degree $TH_0$, the controller 300 goes to box 610. If throttle opening degree TH is not less than critical throttle opening degree $TH_0$, the controller 300 sets the duty $DUTY_{129}$ equal to 0% at box 606. The controller 300, next, sets desired step number $P_D$ equal to 0 (zero) at box 608. Then, the controller 300 goes to box 630.

In box 610, the controller 300 determines whether actual step number $P_A$ is 0 (zero). If actual step number $P_A$ is zero ($P_A=0$), the controller 300 goes to box 612. If actual step number $P_A$ is not equal to zero, the controller 300 goes to box 620.

In box 612, the controller 300 computes desired deviation e by subtracting a preset second target value Nm2 from deviation $N_D$. Next, the controller 300 performs a table look-up operation of a second feedback gain map to determine a second feedback gain $G_2$ for the desired deviation e. The controller 300, next, computes at box 616 $DUTY_{129}$, which is expressed by a predetermined function of the desired deviation e and second feedback gain $G_2$. In the next box 618, the controller 300 sets actual step number $P_A$ equal to 0 (zero). The controller 300, next goes to box 636.

In box 624, the controller 300 determines whether shift position is D range. If D range is chosen, the controller 300 performs a table look-up operation of a shift pattern map for D range based on vehicle speed V and throttle opening degree TH, at box 626, to determine a CVT ratio for V and TH in terms of desired step number $P_D$. Next, the controller 300 goes to box 630.

If, at box 624, D range is not chosen, the controller 300 determines, at box 639, whether shift position is L range. If L range is chosen, the controller 300 performs, at box 639, a table look-up operation of a shift pattern map for L range based on vehicle speed V and throttle opening degree TH to determine a CVT ratio for V and TH in terms of desired step number $P_D$. The controller 300, next, goes to box 630. If, at box 639, the shift position is not L range, the controller 300 performs, at box 640, a table look-up operation of a shift pattern map for R range based on vehicle speed V and throttle opening degree TH to determine a CVT ratio for V and TH in terms of desired step number $P_D$. The controller 300, next, goes to box 630.

In box 630, the controller 300 compares actual step number $P_A$ with desired step number $P_D$. If $P_A$ is equal to $P_D$, the controller 300 goes to box 636. If $P_A$ is less than $P_D$, the controller 300 moves a stepping motor drive signal by one step in an upshift direction at box 632 and increases actual step number $P_A$ by one at box 634. The controller 300, next, goes to box 636.

If, at box 630, $P_A$ is greater than $P_D$, the controller 300 moves stepping motor drive signal by one step in a downshift direction at box 620 and decreases $P_A$ by one at box 622. The controller 300, next, goes to box 636.

In box 636, the controller 300 outputs the stepping motor drive signal to stepping motor driver 317. In box 638, the controller 300, next, outputs $DUTY_{120}$, $DUTY_{128}$ and $DUTY_{129}$ to pressure modifier duty solenoid 120, lock-up duty solenoid 128 and clutch duty solenoid 129, respectively.

The stepping motor driver 317 causes the stepping motor 108 to turn by one step in a direction designated in response to a shift in the stepping motor drive signal.

Varying the duty $DUTY_{129}$ of clutch duty solenoid 129 alters degree of engagement of the forward clutch 40 if it is selected by the manual selector valve 104 or the reverse brake 50 if it is selected by the manual selector valve 104. Complete engagement is accomplished if $DUTY_{129}$ is 0%, while complete disengagement if $DUTY_{129}$ is 100%. The degree of slip of forward clutch 40 or reverse brake 50 increases continuously as $DUTY_{129}$ increases so that the slip can be adjusted to a desired degree corresponding to the value of $DUTY_{129}$. Likewise, degree of slip of the lock-up clutch 12d can be adjusted by altering the duty $DUTY_{128}$.

Creep control is initiated if $P_A=0$ (at box 610) under conditions when $TH<TH_0$ (at box 604) with $V<V_0$ (at box 603) and the degree of slip is determined at box 616.

The D-range shift pattern is a map containing a set of values that CVT ratio may take against various combinations of throttle opening degree TH and vehicle speed V. This set of values can be plotted in FIG. 9 within a zone between the fully drawn lines $C_{Hi}$ and $C_{DLO}$. A curve $C_{PTN}$ drawn by the two-dot chain line illustrates gradual increase of engine speed $N_E$ versus vehicle speed V during gradual acceleration with the shift position D chosen by the operator.

The L-range shift pattern is a map containing still another set of values that CVT ratio may take against various combinations of throttle opening degree TH and vehicle speed V. This still another et of values can be plotted in FIG. 9 on the fully drawn line $C_{Hi}$. In other words, CVT ratio is held at $C_{Hi}$ according to L-range shift pattern.

The D-range, L-range and R-range shift pattern maps are programmed in the form of map in ROM 314 of the controller 300.

From the preceding description of the main routine, it is now understood that the controller 300 does not determine a ratio change command if, at box 602b, the ratio change suspending flag SF is set equal to 1. This is because desired step number $P_D$ is set equal to actual step number $P_A$ at box 602c.

The content of flag SF is determined by execution of sub-routine illustrated in FIG. 11. The controller 300 repeats execution of this sub-routine at regular intervals.

In FIG. 11, at box 102, the controller 300 inputs a new vehicle speed V(n) by performing reading operation of output signal of vehicle speed sensor 302. The controller 300, next, determines whether the previously stored old vehicle speed V(n–1) is zero.

If V(n–1) is equal to 0 (zero), the controller 300 goes to box 106, while, if V(n–1) is not equal to 0 (zero), the controller 300 goes to box 124.

In box 106, the controller 300 determines whether new vehicle speed V(n) is not equal to zero. If vehicle speed V(n) is not equal to zero, the controller 300 inputs, at box 110, throttle opening degree TH by performing reading operation of output signal of throttle position sensor 303. The controller 300, next, determines, at box 112, whether throttle opening degree TH is greater than critical throttle opening degree $TH_0$ of idle operation. If, at box 112, TH is greater than or equal to $TH_0$, the controller 300 goes to box 114. If TH is less than $TH_0$, the controller 300 goes to box 120.

In box 114, the controller 300 starts a timer TM and sets a timer flag TF equal to 1. The controller 300, next, updates the vehicle speed data by setting the old vehicle speed V(n–1) equal to V(n) at box 116. Then, the controller 300 sets ratio change suspending flag SF equal to 1 and communicates the content of the flag SF to the data area allocated for the main routine.

In box 124, the controller 300 determines whether timer flag TF is equal to 1. If TF is not equal to 1, the controller 300 updates the vehicle speed data by setting the old vehicle speed V(n–1) equal to V(n) at box 120. Then, the controller 300 clears or resets ratio change suspending flag SF equal to 0 (zero) and communicates the content of the flag SF to the data area allocated for the main routine.

If, at box 124, timer flag TF is set equal to 1, the controller 300 determines, at box 126, whether timer TM has counted a predetermined period of time, for example 5 seconds. If the predetermined period of time has not passed, the controller 300 goes to box 116 and box 118.

Upon elapse of the predetermined period of time, the controller 300 determines, at box 126, that the timer TM has counted the predetermined period of time and, next, clears or resets timer flag TF at box 128. Then, the controller 300 updates the vehicle speed data at box 120 and next resets ratio change suspending flag SF equal to 0 (zero) at box 122.

From the preceding description of the main routine and sub-routine, it is now understood that the controller 300 starts timer TM, at box 114, when there is an operators's command to request the vehicle to move off from a standstill position. This operator's command is determined when the controller 300 determines an increase of vehicle speed from zero (boxes 104 and 106) and an operator's power request command to cause the engine to increase its speed from idle speed (box 112). During the period of time when the ratio change suspending flag SF is set, the controller 300 continues to set desired step number $P_D$ equal to actual pulse number $P_A$ at box 602c and continues to set $DUTY_{129}$ equal to 0% at box 602d. Thus, the controller 300 continues to output, at box 636, the same step motor drive signal to the stepping motor driver 317 and continues to output 0% to the clutch duty solenoid valve 129. Since actual pulse number $P_A$ is normally reset equal to 0 when the vehicle comes to halt, the controller 300 continues to hold the maximum or largest CVT ratio during the predetermined time after the controller 300 determines operator's command to request the vehicle to move off from a standstill position. Under this condition, the forward clutch 40 (or reverse brake 50) is completely engaged.

From the preceding description, it is now understood that until elapse of the predetermined period of time from the operator's command to request the vehicle to move off from a standstill position, the controller 300 suspends generation of a ratio change command and positions the ratio control element 182 to hold the CVT 29 at the maximum or largest CVT ratio state. Upon elapse of the predetermined period of time, the controller 300 starts generation of the ratio change command (see boxes 624, 626, 630, 632, 634, and 636). The controller 300 determines the ratio change command in response to a CVT ratio error of an actual CVT ratio expressed in terms of actual step number $P_A$ from a desired CVBT ratio expressed in terms of desired step number $P_D$. The ratio change command is instructed to the stepping motor driver 317 in terms of a shift or change in stepping motor drive signal output at box 636. The shift of the stepping motor drive signal is determined at box 632 or box 620 in response to the CVT ratio error determined at box 630.

Let us now consider the case where the vehicle starts moving off from a standstill position with the road wheels slipping on a road with low friction coefficient. Under this condition, the vehicle speed signal V increases as revolution speed of output shaft of CVT 29 increases with increasing revolution speed of the slipping road wheels. The CVT 29, however, is held at the maximum or largest CVT ratio until elapse of the predetermined period of time even if the vehicle speed signal V deviates from actual vehicle speed at which the vehicle moves. Thus, the operator can manipulate the gas pedal 2 to control the vehicle without experiencing undesired upshift causing subsequent unplesant downshift.

The predetermined period of time is set so that the operator can enjoy plesant ride feel in response to degree of depression of gas pedal 2 to move off the vehicle from a standstill position on a road with normal friction coefficient.

What is claimed is:

1. A drivetrain control system adapted for a vehicle driven by an engine, comprising:

a continuously variable transmission (CVT) including a ratio control element positionable to various command positions in response to a ratio change command; and controller means for establishing various CVT ratios, the controller means determining a desired CVT ratio in response to a revolution speed of an output shaft of the CVT and generating the ratio change command in response to the desired CVT ratio, wherein the controller means:

determines whether there is a command to move the vehicle from a standstill position, and suspends generation of the ratio change command until elapse of a preset period from an initiation of the command to move the vehicle from a standstill position.

2. A drivetrain control system as claimed in claim 1, wherein the controller means determines the command to move the vehicle from a standstill position in response to an operator's power request command.

3. A drivetrain control system as claimed in claim 1, wherein the controller means determines the command to move the vehicle from a standstill position in response to a change in the revolution speed of the output shaft and an operator's power request command.

4. A drivetrain control system adapted for a vehicle driven by an engine, comprising:
a variable transmission (CVT) including a ratio control element positionable to various command positions in response to a ratio change command; and
controller means for establishing various CVT ratios, the controller means determining a desired CVT ratio in response to a revolution speed of an output shaft of the CVT and generating the ratio change command in response to the desired CVT ratio, wherein the controller means:
determines whether there is a command to move the vehicle from a standstill position;
activates a timer upon an initiation of the command to move the vehicle from a standstill position; and
suspends generation of the ratio change command during a predetermined period counted by the timer.

5. A drivetrain control system as claimed in claim 4, wherein the controller means determines the command to move the vehicle from a standstill position in response to an operator's power request command.

6. A drivetrain control system as claimed in claim 4, wherein the controller means determines the command to move the vehicle from a standstill position in response to a change in the revolution speed of the output shaft and an operator's power request command.

7. A method for controlling a vehicle drivetrain having an engine adapted to drive the vehicle through a variable transmission (CVT) including a ratio control element positionable to various command positions in response to a ratio change command generated by controller means to establish various CVT ratios, the controller means determining a desired CVT ratio in response to a revolution speed of an output shaft of the CVT and generating the ratio change command in response to a CVT ratio error of an actual CVT ratio from the desired CVT ratio, the control method comprising the steps of:
determining whether there is a command to move the vehicle from a standstill position; and
suspending generation of the ratio change command until elapse of a preset period from an initiation of the command to move the vehicle from a standstill position.

8. A method for controlling a vehicle drivetrain having an engine adapted to drive the vehicle through a variable transmission (CVT) including a ratio control element positionable to various command positions in response to a ratio change command generated by controller means to establish various CVT ratios, the controller means determining a desired CVT ratio in response to a revolution speed of an output shaft of the CVT and generating the ratio change command in response to a CVT ratio error of an actual CVT ratio from the desired CVT ratio, the control method comprising the steps of:
determining whether there is a command to move the vehicle from a standstill position;
suspending generation of the ratio change command during a preset period from an initiation of the command to move the vehicle from a standstill position; and
generating the ratio change command upon elapse of said preset period.

9. A drivetrain control system adapted for a vehicle driven by an engine, comprising:
a variable transmission (CVT) including a ratio control element positions to various command positions in response to a ratio change command; and
controller means for establishing various CVT ratios, the controller means generating the ratio change command in response to a revolution speed of an output shaft of the CVT, wherein the controller means:
determines a command to move the vehicle from a standstill position,
activates a timer upon an initiation of the command to move the vehicle from a standstill position, and
suspends generation of the ratio change command during a predetermined period counted by the timer.

10. A vehicle drivetrain comprising:

an engine adapted to drive a vehicle;

a continuously variable transmission (CVT) including an input shaft drivingly connected to the engine and an output shaft, the continuously variable transmission including a ratio control element positionable to various command positions in response to a ratio change command to establish various CVT ratios; and controller means for generating the ratio change command in response to a revolution speed of the output shaft of the CVT, the controller means including a timer, wherein said controller means:
determines whether there is a command to move the vehicle from a standstill position,
activates the timer upon an initiation of the command to move the vehicle from a standstill position, and
suspends generation of the ratio change command during a predetermined period counted by the timer.

* * * * *